Dec. 22, 1925.

E. J. HAWKINS 1,566,598

AUTOMOBILE SIGNAL

Filed May 17, 1923 2 Sheets-Sheet 1

Inventor
Edward J. Hawkins
By
Attorney

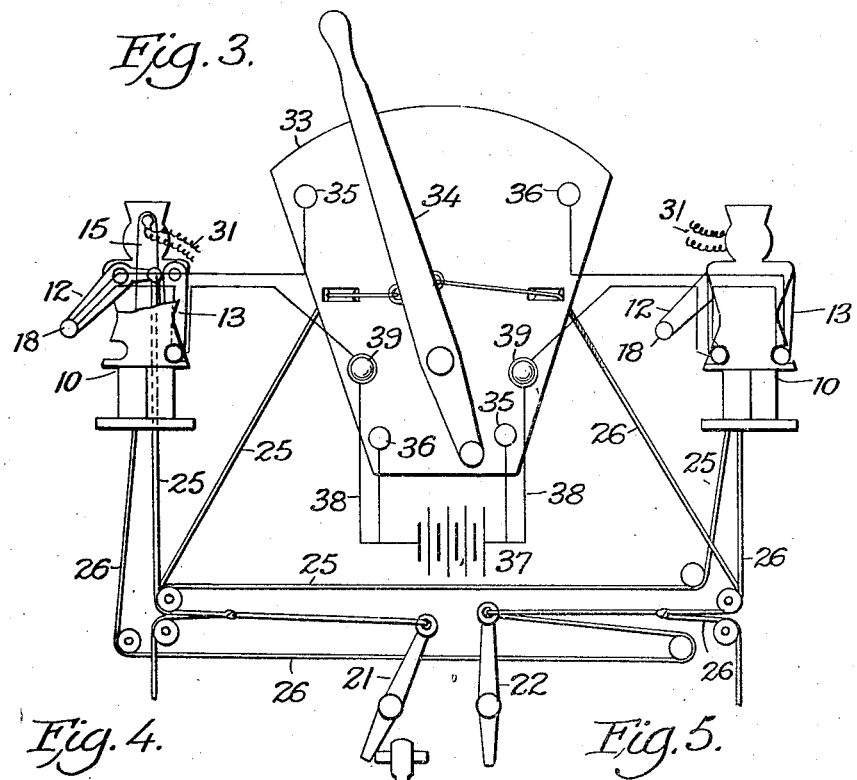

Patented Dec. 22, 1925.

1,566,598

UNITED STATES PATENT OFFICE.

EDWARD J. HAWKINS, OF ROME, NEW YORK.

AUTOMOBILE SIGNAL.

Application filed May 17, 1923. Serial No. 639,536.

*To all whom it may concern:*

Be it known that I, EDWARD J. HAWKINS, a resident of Rome, in the county of Oneida and State of New York, a citizen of the United States, have invented certain new and useful Improvements in Automobile Signals, of which the following is a specification.

This invention relates to vehicle signals and its object is the location of semaphores or similar devices at the front and rear of a vehicle so that they may be automatically operated with the movement of the steering gear or the actuation of the brake lever to indicate the movement of the car to the right or to left or the slacking of its speed and stopping.

A further object of the invention is the use of lights to indicate the direction of movement or the stopping of the car and circuit closers for the wires to conduct the electric currents to said lights, the circuit closers being automatically closed with the operation of the steering mechanism or the brake lever so that the signals shall be as efficient by night as in day time.

These and other objects of the invention are more fully described in the following specification, set forth in the appended claims and shown in the accompanying drawings, wherein:

Fig. 3 is a diagrammatic view of the automatic lighting switch and the steering rod.

Fig. 4 is a sectional view of the semaphore carrier or upright.

Fig. 5 is a view in elevation of the semaphore carrier or upright.

Figure 1:
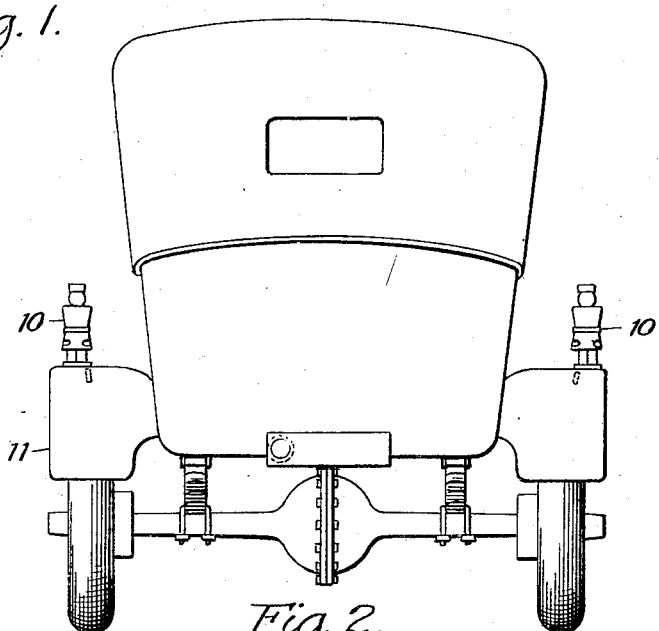
Figure 1 is a rear view of a motor vehicle showing the signals mounted at the rear of the two sides.

The semaphores or signals are mounted in frames or uprights 10 preferably of some fanciful design, as shown in the drawings, and there may be any number desired and secured to the upper face of the mud guard 11. While each mudguard is shown as supporting one upright, two are preferred in actual use, and these are mounted at one side of the vehicle and at the front and rear.

Each of these uprights 10 has the arms 12 and 13 pivoted at its sides as best shown in Figs. 3 and 4 and, as will be seen in the latter, recoil springs 14 may be secured to the arm or its axis to return it to its inoperative position. These arms are normally hidden in the upright, which is formed of the two parallel sides, but when swung to the horizontal position point to the direction in which the vehicle is about to turn.

A third arm 15 is adapted to move vertically but is normally hidden within the frame. When the brake is applied to the wheels the movement of the brake lever elevates this arm and it indicates that the vehicle is to slack its speed or stop and any vehicles at the rear are thereby warned. Through the slot 116 in this arm a pin 17 passes and secures the arm and permits of its longitudinal movement.

Each of the arms has an electric lamp 18 in its free end that is hidden when the arm is in its inoperative position but is energized and illuminated when operated as will be later explained.

Figure 2:
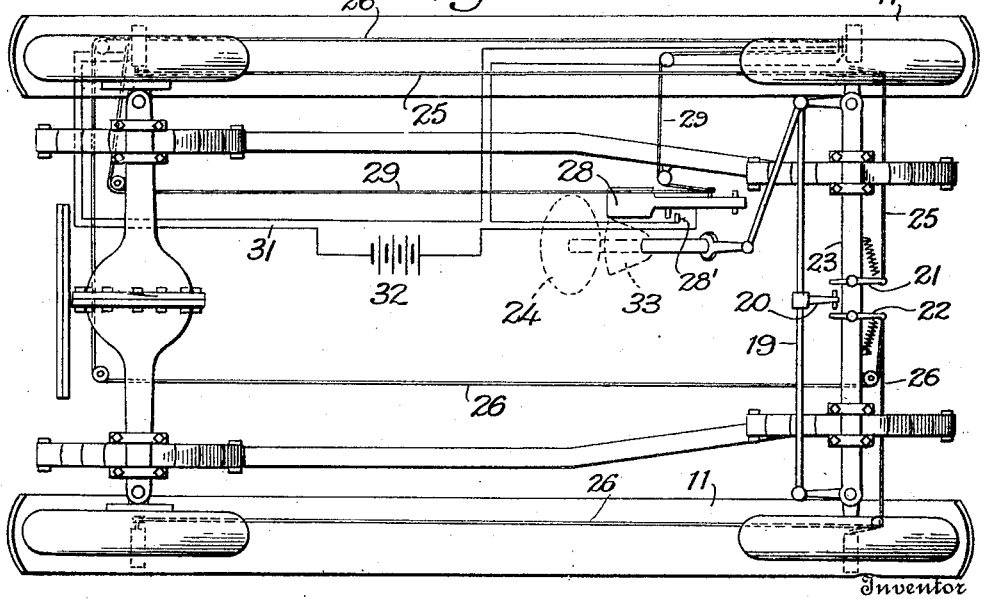
Fig. 2 is a bottom plan view of the vehicle showing the actuating mechanism.

In the operation of the arms reference may be had to Fig. 2 where it will be seen that the shift-rod 19 of the steering gear an arm 20 is secured and as the rod is moved the arm 20 comes in contact with either of the levers 21 or 22 pivoted at any convenient part of the vehicle but shown attached to the front axle 23.

If the steering wheel 24 is turned to cause the vehicle in Fig. 1 to turn to the left, the arm 12 will be thrown up by the arm 20 coming in contact with the lever 21 and through suitable cords 25 and pulleys elevate said arm 12.

When the reverse movement takes place the lever 22 actuates the cords 26 to elevate the arm 13 and indicate that the vehicle will turn to the right.

Should the brake lever 28 be depressed the cord 29 is drawn upon and passing over the pulley 30 (Fig. 4) it elevates the "stop" arm 15, and closes the electric circuit contacts 28'.

These operations to actuate the arms are obviously at different times and do not engage the operator's attention as they are performed by the mechanisms above described and indicate the actions of the respective mechanisms in the daylight but at night the flashing of the lamps to indicate slacking of speed is accomplished by the circuit 31 comprising the contacts 28' and battery or other source of energy 32 to illumine the lamps in arms 15 as they are elevated.

By means of the switch 33 shown in Fig.

3 it will be seen that as the cords 25 are drawn upon they shift a metallic conductive lever 34 into contact with the buttons 35 and close a circuit that will energize the left hand signal lamp. When the cords 26 are operated the movement of the lever 34 is reversed and the buttons 36 are bridged and the lamps of arms 13 are illumined. These operations are performed by means of the battery or source of electrical energy 37 and the circuits 38 with tell-tale lights 39. The switch 33 is secured to the steering shaft tube and before the operator of the vehicle so he may be assured that the signals are working satisfactorily.

It is obvious that the parts may be otherwise arranged or altered without departing from the essential features above described or from the scope of the appended claims.

What I claim as new is:

1. In vehicle signals, the combination of the link bar of a steering mechanism of a vehicle, an arm secured to the bar, levers pivoted adjacent to the arm, uprights having semaphore arms at each side, a cord from each lever to a different semaphore arm, a brake lever, and a third semaphore arm operated by the brake lever.

2. In a vehicle signal, the combination of the steering link rod, an arm secured to same, levers pivoted in the path of the arm, an upright having pivoted semaphore arms, cords connecting each lever with a semaphore arm, a third semaphore arm adapted to reciprocate, a brake lever adapted to operate the third semaphore arm.

In testimony whereof I hereunto affix my signature.

EDWARD J. HAWKINS.